US008651958B2

(12) United States Patent
Kim

(10) Patent No.: US 8,651,958 B2
(45) Date of Patent: Feb. 18, 2014

(54) SYSTEM FOR TOURNAMENT ON-LINE GAME BY BATCH PROCESSING

(76) Inventor: Young-June Kim, Seoul (KR)

( * ) Notice: Subject to any disclaimer, the term of this patent is extended or adjusted under 35 U.S.C. 154(b) by 13 days.

(21) Appl. No.: 13/386,403

(22) PCT Filed: Sep. 13, 2010

(86) PCT No.: PCT/KR2010/006215

§ 371 (c)(1), (2), (4) Date: Jan. 20, 2012

(87) PCT Pub. No.: WO2011/055904

PCT Pub. Date: Dec. 5, 2011

(65) Prior Publication Data

US 2012/0115617 A1 May 10, 2012

(30) Foreign Application Priority Data

Nov. 3, 2009 (KR) ........................ 10-2009-0105434

(51) Int. Cl.

*A63F 9/24* (2006.01)
*A63F 13/00* (2006.01)

(52) U.S. Cl.

USPC .................... 463/42; 463/25; 463/40; 463/43

(58) Field of Classification Search

USPC ....................................................... 463/29, 42
See application file for complete search history.

(56) References Cited

U.S. PATENT DOCUMENTS 5,359,510 A * 10/1994 Sabaliauskas .................. 700/91
5,768,382 A * 6/1998 Schneier et al. .............. 380/251
5,779,549 A * 7/1998 Walker et al. ................... 463/42
5,813,913 A * 9/1998 Berner et al. .................... 463/40
6,023,729 A * 2/2000 Samuel et al. ................ 709/228
6,224,486 B1 * 5/2001 Walker et al. ................... 463/42
6,352,479 B1 * 3/2002 Sparks, II ........................ 463/42
6,425,828 B2 * 7/2002 Walker et al. ................... 463/42
6,648,760 B1 * 11/2003 Nicastro .......................... 463/23
6,712,702 B2 * 3/2004 Goldberg et al. ............... 463/42
6,887,159 B2 * 5/2005 Leen et al. ....................... 463/42
6,899,628 B2 * 5/2005 Leen et al. ....................... 463/42
6,979,267 B2 * 12/2005 Leen et al. ....................... 463/42
7,029,394 B2 * 4/2006 Leen et al. ....................... 463/16
7,076,434 B1 * 7/2006 Newnam et al. ............. 705/7.29

(Continued)

FOREIGN PATENT DOCUMENTS

JP 2005-168740 A 6/2005
JP 2005-316807 A 11/2005
KR 10-2000-0018155 A 4/2000
KR 10-0638496 B1 10/2006

*Primary Examiner* — Steven J Hylinski

(74) *Attorney, Agent, or Firm* — Edwards Wildman Palmer LLP

(57) ABSTRACT

A method for a tournament-type on-line game by batch processing includes generating an independent game turn determining both participants in each match of the game, to every participant; providing match information, which includes the game turn information, victory criterion information determined in association with the game turn information and allowing the participant to win in each match until stage K, and an input circumstance for inputting variable information, to a client of the participant; receiving variable information from the client through the provided match information; and operating all of the received variable information by batch processing to determine winners until stage K, wherein an operation result of the variable information received from both clients of each match is compared with the victory criterion information so that the participant having the victory criterion information identical to the operation result is determined as a winner of each match.

4 Claims, 10 Drawing Sheets

(56) References Cited

U.S. PATENT DOCUMENTS

| | | | | |
|---|---|---|---|---|
| 7,192,352 | B2 * | 3/2007 | Walker et al. | 463/42 |
| 7,354,345 | B2 * | 4/2008 | Bortnik et al. | 463/42 |
| 7,390,255 | B2 * | 6/2008 | Walker et al. | 463/9 |
| 7,614,955 | B2 * | 11/2009 | Farnham et al. | 463/42 |
| 2001/0004609 | A1 * | 6/2001 | Walker et al. | 463/42 |
| 2002/0119824 | A1 * | 8/2002 | Allen | 463/42 |
| 2002/0193162 | A1 * | 12/2002 | Walker et al. | 463/42 |
| 2006/0246983 | A1 * | 11/2006 | Huard et al. | 463/16 |
| 2006/0287046 | A1 * | 12/2006 | Walker et al. | 463/16 |
| 2007/0117618 | A1 * | 5/2007 | Walker et al. | 463/29 |
| 2007/0117620 | A1 * | 5/2007 | Walker et al. | 463/29 |
| 2007/0117621 | A1 * | 5/2007 | Walker et al. | 463/29 |
| 2007/0117622 | A1 * | 5/2007 | Walker et al. | 463/29 |
| 2007/0117641 | A1 * | 5/2007 | Walker et al. | 473/131 |
| 2007/0123347 | A1 * | 5/2007 | Walker et al. | 463/29 |
| 2008/0207332 | A1 * | 8/2008 | Bortnik et al. | 463/42 |

* cited by examiner

FIG. 5

| PARTICIPANT WITH INITIAL GAME TURN 1 (#1) | | | | |
|---|---|---|---|---|
| STAGE | FIRST STAGE | SECOND STAGE | THIRD STAGE | FOURTH STAGE (FINAL) |
| GAME TURN | #1 | #1 | #1 | #1 |

| PARTICIPANT WITH INITIAL GAME TURN 2 (#2) | | | | |
|---|---|---|---|---|
| STAGE | FIRST STAGE | SECOND STAGE | THIRD STAGE | FOURTH STAGE (FINAL) |
| GAME TURN | #2 | #1 | #1 | #1 |

| PARTICIPANT WITH INITIAL GAME TURN 3 (#3) | | | | |
|---|---|---|---|---|
| STAGE | FIRST STAGE | SECOND STAGE | THIRD STAGE | FOURTH STAGE (FINAL) |
| GAME TURN | #3 | #2 | #1 | #1 |

...

| PARTICIPANT WITH INITIAL GAME TURN 15 (#15) | | | | |
|---|---|---|---|---|
| STAGE | FIRST STAGE | SECOND STAGE | THIRD STAGE | FOURTH STAGE (FINAL) |
| GAME TURN | #15 | #8 | #4 | #2 |

| PARTICIPANT WITH INITIAL GAME TURN 16 (#16) | | | | |
|---|---|---|---|---|
| STAGE | FIRST STAGE | SECOND STAGE | THIRD STAGE | FOURTH STAGE (FINAL) |
| GAME TURN | #16 | #8 | #4 | #2 |

FIG. 6

| PARTICIPANT WITH INITIAL GAME TURN 1 (#1) | | | | |
|---|---|---|---|---|
| STAGE | FIRST STAGE | SECOND STAGE | THIRD STAGE | FOURTH STAGE (FINAL) |
| GAME TURN | #1 | #1 | #1 | #1 |
| VICTORY CRITERION INFORMATION | ODD | ODD | ODD | ODD |

| PARTICIPANT WITH INITIAL GAME TURN 2 (#2) | | | | |
|---|---|---|---|---|
| STAGE | FIRST STAGE | SECOND STAGE | THIRD STAGE | FOURTH STAGE (FINAL) |
| GAME TURN | #2 | #1 | #1 | #1 |
| VICTORY CRITERION INFORMATION | EVEN | ODD | ODD | ODD |

| PARTICIPANT WITH INITIAL GAME TURN 3 (#3) | | | | |
|---|---|---|---|---|
| STAGE | FIRST STAGE | SECOND STAGE | THIRD STAGE | FOURTH STAGE (FINAL) |
| GAME TURN | #3 | #2 | #1 | #1 |
| VICTORY CRITERION INFORMATION | ODD | EVEN | ODD | ODD |

...

| PARTICIPANT WITH INITIAL GAME TURN 15 (#15) | | | | |
|---|---|---|---|---|
| STAGE | FIRST STAGE | SECOND STAGE | THIRD STAGE | FOURTH STAGE (FINAL) |
| GAME TURN | #15 | #8 | #4 | #2 |
| VICTORY CRITERION INFORMATION | ODD | EVEN | EVEN | EVEN |

| PARTICIPANT WITH INITIAL GAME TURN 16 (#16) | | | | |
|---|---|---|---|---|
| STAGE | FIRST STAGE | SECOND STAGE | THIRD STAGE | FOURTH STAGE (FINAL) |
| GAME TURN | #16 | #8 | #4 | #2 |
| VICTORY CRITERION INFORMATION | EVEN | EVEN | EVEN | EVEN |

FIG. 7

| PARTICIPANT WITH INITIAL GAME TURN 1 (#1) | | | | |
|---|---|---|---|---|
| STAGE | FIRST STAGE | SECOND STAGE | THIRD STAGE | FOURTH STAGE (FINAL) |
| GAME TURN | #1 | #1 | #1 | #1 |
| VICTORY CRITERION INFORMATION | ODD | ODD | ODD | ODD |
| INPUT OF CARD | | | | |

| PARTICIPANT WITH INITIAL GAME TURN 2 (#2) | | | | |
|---|---|---|---|---|
| STAGE | FIRST STAGE | SECOND STAGE | THIRD STAGE | FOURTH STAGE (FINAL) |
| GAME TURN | #2 | #1 | #1 | #1 |
| VICTORY CRITERION INFORMATION | EVEN | ODD | ODD | ODD |
| INPUT OF CARD | | | | |

| PARTICIPANT WITH INITIAL GAME TURN 3 (#3) | | | | |
|---|---|---|---|---|
| STAGE | FIRST STAGE | SECOND STAGE | THIRD STAGE | FOURTH STAGE (FINAL) |
| GAME TURN | #3 | #2 | #1 | #1 |
| VICTORY CRITERION INFORMATION | ODD | EVEN | ODD | ODD |
| INPUT OF CARD | | | | |

...

| PARTICIPANT WITH INITIAL GAME TURN 15 (#15) | | | | |
|---|---|---|---|---|
| STAGE | FIRST STAGE | SECOND STAGE | THIRD STAGE | FOURTH STAGE (FINAL) |
| GAME TURN | #15 | #8 | #4 | #2 |
| VICTORY CRITERION INFORMATION | ODD | EVEN | EVEN | EVEN |
| INPUT OF CARD | | | | |

| PARTICIPANT WITH INITIAL GAME TURN 16 (#16) | | | | |
|---|---|---|---|---|
| STAGE | FIRST STAGE | SECOND STAGE | THIRD STAGE | FOURTH STAGE (FINAL) |
| GAME TURN | #16 | #8 | #4 | #2 |
| VICTORY CRITERION INFORMATION | EVEN | EVEN | EVEN | EVEN |
| INPUT OF CARD | | | | |

FIG. 8

| PARTICIPANT WITH INITIAL GAME TURN 1 (#1) | | | | |
|---|---|---|---|---|
| STAGE | FIRST STAGE | SECOND STAGE | THIRD STAGE | FOURTH STAGE (FINAL) |
| GAME TURN | #1 | #1 | #1 | #1 |
| VICTORY CRITERION INFORMATION | ODD | ODD | ODD | ODD |
| INPUT OF CARD | 1 | 2 | 1 | 1 |

| PARTICIPANT WITH INITIAL GAME TURN 2 (#2) | | | | |
|---|---|---|---|---|
| STAGE | FIRST STAGE | SECOND STAGE | THIRD STAGE | FOURTH STAGE (FINAL) |
| GAME TURN | #2 | #1 | #1 | #1 |
| VICTORY CRITERION INFORMATION | EVEN | ODD | ODD | ODD |
| INPUT OF CARD | 1 | 1 | 1 | 1 |

| PARTICIPANT WITH INITIAL GAME TURN 3 (#3) | | | | |
|---|---|---|---|---|
| STAGE | FIRST STAGE | SECOND STAGE | THIRD STAGE | FOURTH STAGE (FINAL) |
| GAME TURN | #3 | #2 | #1 | #1 |
| VICTORY CRITERION INFORMATION | ODD | EVEN | ODD | ODD |
| INPUT OF CARD | 2 | 2 | 1 | 2 |

. . .

| PARTICIPANT WITH INITIAL GAME TURN 15 (#15) | | | | |
|---|---|---|---|---|
| STAGE | FIRST STAGE | SECOND STAGE | THIRD STAGE | FOURTH STAGE (FINAL) |
| GAME TURN | #15 | #8 | #4 | #2 |
| VICTORY CRITERION INFORMATION | ODD | EVEN | EVEN | EVEN |
| INPUT OF CARD | 1 | 2 | 2 | 2 |

| PARTICIPANT WITH INITIAL GAME TURN 16 (#16) | | | | |
|---|---|---|---|---|
| STAGE | FIRST STAGE | SECOND STAGE | THIRD STAGE | FOURTH STAGE (FINAL) |
| GAME TURN | #16 | #8 | #4 | #2 |
| VICTORY CRITERION INFORMATION | EVEN | EVEN | EVEN | EVEN |
| INPUT OF CARD | 2 | 2 | 2 | 2 |

SYSTEM FOR TOURNAMENT ON-LINE GAME BY BATCH PROCESSING

CROSS-REFERENCES TO RELATED APPLICATIONS

This application is a U.S. national phase application, pursuant to 35 U.S.C. §371, of PCT/KR2010/006215, filed Sep. 13, 2010, designating the United States, which claims priority to Korean Application No. 10-2009-0105434, filed Nov. 3, 2009. The entire contents of the aforementioned patent applications are incorporated herein by this reference.

TECHNICAL FIELD

The present disclosure relates to a method for a tournament-type game and a method for providing or selling products by using the game. More particularly, the present disclosure relates to a method for a tournament-type on-line game and a method for selling products by using the same, which allows batch processing of all or a part of the tournament-type games to enhance objectivity and fairness of the game as well as increase interest in the game so that the desires of all subjects participating in the on-line transaction of a product may be satisfied.

BACKGROUND ART

Along with the universal propagation of the Internet, the development of Internet communication technologies, and the rapid growth of communication infrastructures supporting the same, on-line space through the Internet has become another living realm for the modern day people.

On-line space is utilized in various ways and its representative example is purchasing products on-line. As the paradigm of life style and time utilization of modern day people are changing and developing in various ways, it is statistically known that the model for purchasing products on-line has not only grown as large as the traditional off-line market, but also is increasingly developing to cover more diverse and wider ranges.

Activities for purchasing products on-line tend to rapidly increase, and with the combination of innate on-line characteristics of being able to overcome the limitation on physical space such as the location and number of people, there have been proposed various forms of models for purchasing products on-line.

The most representative example is a lottery or a game that provides prizes, gift certificates, and coupons to a specific number of people participating in the lottery or game. This method is recognized positively for attracting interest and attention of the users since they are able to purchase expensive products with an amount of money functionally divided by the number of users.

Among the above methods, the method of being able to supply expensive products inexpensively in a lottery has advantages in that its procedure is relatively simple and products may be provided in various ways.

However, such a lottery, particularly an on-line lottery, has problems in fairness and objectivity since the lottery procedure is not clearly exposed to the outside and possibilities of the lottery result being rigged due to the manipulations of the insiders exist. In addition, the lottery procedure is too simple to attract the interest of users. For this reason, even though the lottery has been attempted and proposed as an on-line transaction method for a considerably long time, the lottery method is used as a one time event rather than as a regular transaction method.

Meanwhile, in the case of the transaction method using a game, it has advantages in that it may attract general users by means of the game itself; however, if the game is too complicated or difficult, customers are more likely to lose interest in the game.

A transaction method in which products are repeatedly or successively sold, the time invested in playing the game is a very important element, unlike a one-time purchase method. Therefore, regardless of the complexity or the level of difficulty, a league game may not be feasible and instead a tournament game maybe proposed to determine the final winner. With the premise that the above mentioned tournament type game has a lot of participants, an exuberant amount of games need to be played and so in reality, the utilization of tournament type game is low in number due to problems of instantaneity, repeated reproducibility and simple processing.

In other words, in order to allow numerous people to access and enjoy a game simultaneously and to operate an on-line transaction method for providing a product to a final winner or the like in a stable, repetitive and successive way so that it becomes one of the regular transaction methods, there exists the necessity of a method which has transaction safety elements such as fairness and objectivity, easy repeated reproducibility of games, attraction of interest, or the like.

SUMMARY OF THE DISCLOSURE

Technical Problem

The present disclosure is designed to solve the problems of the prior art, and therefore it is an object of the present disclosure to provide a method for a tournament-type on-line game by batch processing, which may allow numerous people to participate in the game in a short time, ensure fairness and transparency of the game, innovatively shorten the time invested in playing the game, continuously maintain interest and suspense as to the result of the game, and provide an on-line transaction method using the tournament-type on-line game by batch processing.

Other objects and advantages of the present disclosure will be understood by the following description and become more apparent from the embodiments of the present disclosure, which are set forth herein. It will also be apparent that objects and advantages of the present disclosure can be embodied easily by the means defined in claims and combinations thereof.

Technical Solution

In one aspect, there is provided a method for a tournament-type on-line game by batch processing, which includes a participation information providing step for providing participation condition information of the number of participants in a one-on-one tournament-type game or the period of the game; a participation request receiving step for receiving participation request information of the game from on-line users; a game turn generating step for generating an independent game turn, which determines both participants in each match of the game, to every participant whose participation request is received, after the participation request is completely received; a match information providing step for providing match information, which includes the game turn information given to the participant, victory criterion information determined in association with the game turn information and allowing the participant to win in each match until stage K of the tournament-type game (where K is a natural number not less than 1), and an input circumstance for the input of variable information for winning each match, to each participant; a variable information inputting step for receiving variable information from the participant through the input circumstance of the provided match information; and a victory/defeat calculating step for operating all of the received variable information by batch processing to determine winners until stage K, wherein it is determined whether an operation result of the variable information received from both participants of each match is identical to the victory criterion information so that the participant having the victory criterion information identical to the operation result is determined as a winner of each match.

Here, the participation condition information is preferably set so that the number of participants in the tournament-type game corresponds to 2 to the $n^{th}$ power (n is a natural number not less than 1).

In addition, the victory criterion information is preferably given an odd number to one of both participants in the match and an even number given to the other participant in the match, the variable information is preferably an odd number or an even number, and the victory/defeat calculating step operates to obtain a sum or difference of the variable information input by both participants.

Preferably, the variable information inputting step sets a time limit for receiving variables so that the participants input variable information within the time limit, and, in the case where a participant does not input variable information within the time limit, an opponent of the participant not inputting variable information may be determined as a winner.

In another aspect, there is also provided a method for a tournament-type on-line game by batch processing, which includes a participation information providing step for providing participation condition information of the number of participants of a tournament-type game or the period of the game; a participation request receiving step for receiving participation request information of the game from on-line users; a game turn generating step for generating an independent game turn, which determines both participants in each match of the game, to every participant whose participation request is received, after the participation request is completely received; a match information providing step for providing match information, which includes the game turn information given to the participant, victory criterion information determined in association with the game turn information and allowing the participant to win in each match of the game, and an input circumstance for the input of variable information for winning the match, to each participant; a victory/defeat calculating step for operating the variable information input by both participants of each match to determine a winner of the match if the variable information is input from the participant through the input circumstance of the provided match information, wherein it is determined whether an operation result of the variable information received from both participants of the match is identical to the victory criterion information so that the participant having the victory criterion information identical to the operation result is determined as a winner of each match; and a repeating step for setting a winner in the victory/defeat calculating step as a participant of an upper-stage match and repeating the game turn generating step, the match information providing step, and the victory/defeat calculating step until a final winner is determined.

Advantageous Effects

The method for a tournament-type on-line game by batch processing according to the present disclosure may tense up the users of the game while contending for victory throughout the game, which may further entice the interest and participation of the users. In addition, since the game may be operated in a fast and simple pace with the enhanced efficiency in identical repeated operation, the reproducibility may be more easily enhanced.

In addition, since unfair factors in and out of the game procedure may be eliminated, fairness and transparency may be ensured when performing the game or selling products by using the game, which allows the impression of a more reliable on-line transaction method.

A basic infrastructure for successively selling products through the on-line game method having innate characteristics of the present disclosure may be provided, making it possible to implement a method which may ensure satisfactory profits for all subjects, namely buyers, sellers and operators, associated with transaction of various kinds of products including expensive products. In addition, since high-quality products may be more efficiently distributed by using the features of the present disclosure which are organically combined with the game participation of a buyer, the present invention may have a key part in assuring a healthy transaction system.

In other words, the method of the present disclosure may induce active participation of game users by just the game being dynamic, objective, and fair. Therefore, with the active participation from the game users, the seller may sell products in large quantities or repeatedly without any kind of sales promotion policy such as a discount or the like. Therefore, the present disclosure may have a key part in ensuring profit for the seller.

BRIEF DESCRIPTION OF DRAWINGS

Other objects and aspects of the present disclosure will become apparent from the following descriptions of the embodiments with reference to the accompanying drawings in which:

FIG. 5 is a schematic diagram exemplarily showing matches of each stage and game turns generated according to each stage;

FIG. 6 is a schematic diagram exemplarily showing matches of each stage, game turns generated according to each stage, and determination criterion information associated therewith according to an embodiment of the present disclosure;

FIG. 7 is a schematic diagram exemplarily showing match information provided to each participant according to an embodiment of the present disclosure;

FIG. 8 is a schematic diagram exemplarily showing variables for game competition input by each participant through the match information according to an embodiment of the present disclosure;

DETAILED DESCRIPTION OF EMBODIMENTS

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the spirit and scope of the disclosure.

First, the overall system for implementing a method for a tournament-type on-line game method and a transaction method using the game according to the present disclosure will be described in brief with reference to FIG. 1.

Figure 1:
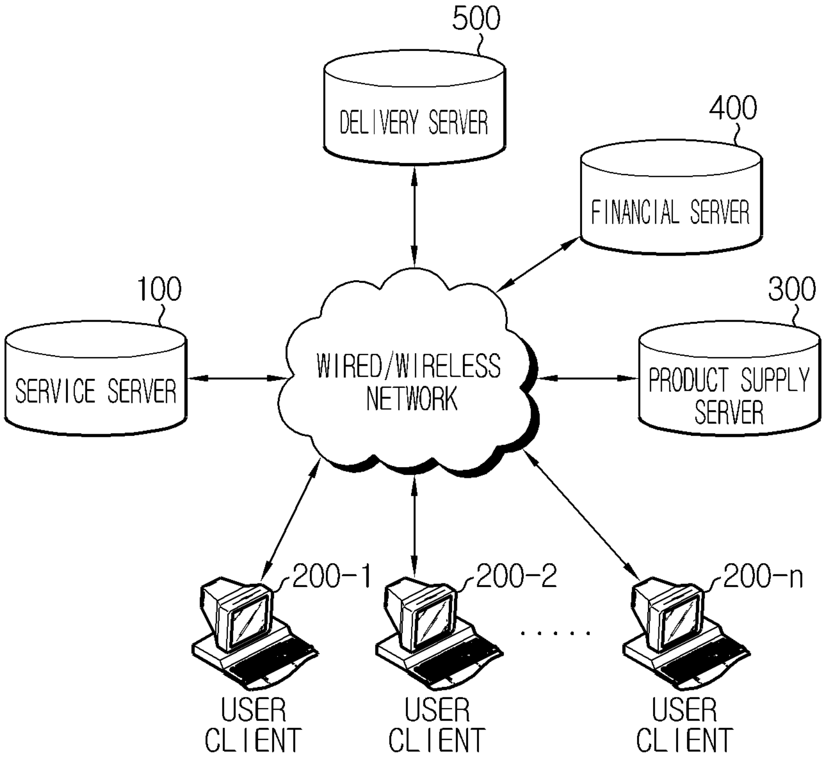
FIG. 1 is a block diagram showing an overall system for implementing a method for a tournament-type on-line game and a transaction method using the game according to the present disclosure.

As shown in FIG. 1, a service server 100 which is a server for implementing the method for a tournament-type on-line transaction according to the present disclosure connects to a plurality of user clients 200 through a wired/wireless network such as the Internet.

The user client 200 is a term representing an agent responding to the service server 100 of the present disclosure and refers to a user accessing the service server 100 on-line. In the following description, the terms “client” or “user” will be used for representing the user client 200 unless otherwise stated.

When connecting to a user accessing the service server 100, the service server 100 of the present disclosure may operate a game and perform a product distributing process simultaneously. Therefore, the service server 100 may also organically connect to a product supply server 300 taking charge of supplying products, a financial server 400 for costing processes, and a delivery server 500 for performing delivery-related processes, through a wired/wireless network.

The service server 100 of the present disclosure receives products suitable for the method of the present disclosure from the product supply server 300 and selects products to be applied to the game among the supplied products based on a predetermined selection criterion. The information about the selected products is provided to a user 200 accessing the service server 100 on-line together with the description about the game, an interface window required for processing the game, a data input window circumstance, or the like.

The costs involved in the purchasing or sale of a product may be determined by means of a functional relation where the number of participants, the price of the subject product, a fee or charge are used as variables, and the determined cost may be received through an algorithm of the financial server 400 according to an embodiment.

If the game ends and a final winner or a winner satisfying a predetermined criterion is determined, a predetermined product or its substitute such as various kinds of marketable securities, gift certificates, coupons, and mileages is provided to the winner. When the product is provided, the delivery server 500 may be associated to provide the product in a one-stop manner so as to further enhance the user convenience.

Detailed configuration and operations of the product supply server 300, the financial server 400, and the delivery server 500 are well known in the art and not essential in the present disclosure, and so they are not described in detail here.

Hereinafter, a preferred embodiment of the present disclosure will be described in more detail with reference to the accompanying drawings.

Figure 2:
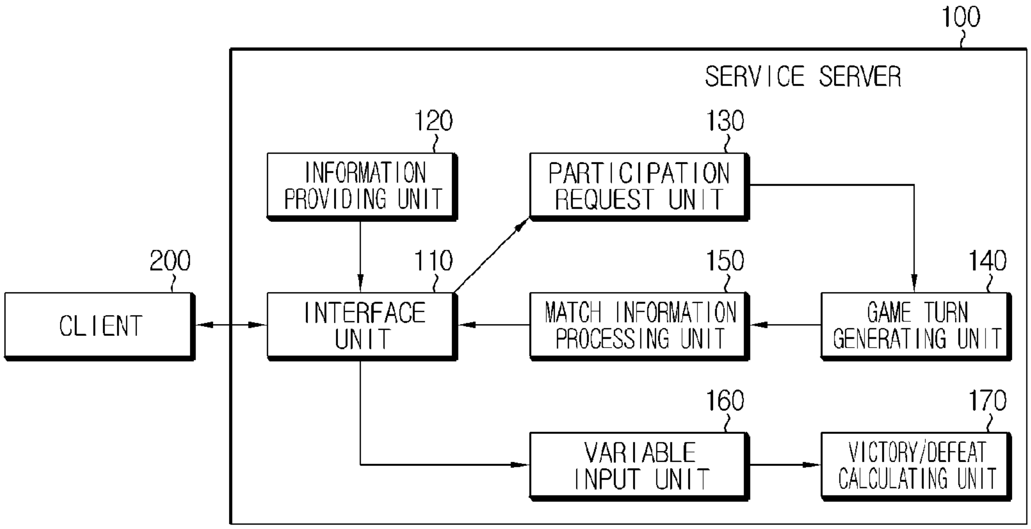
FIG. 2 is a block diagram showing detailed configuration of a service server used in the method for a tournament-type on-line game or the transaction method using the game according to an embodiment of the present disclosure.
Figure 3:
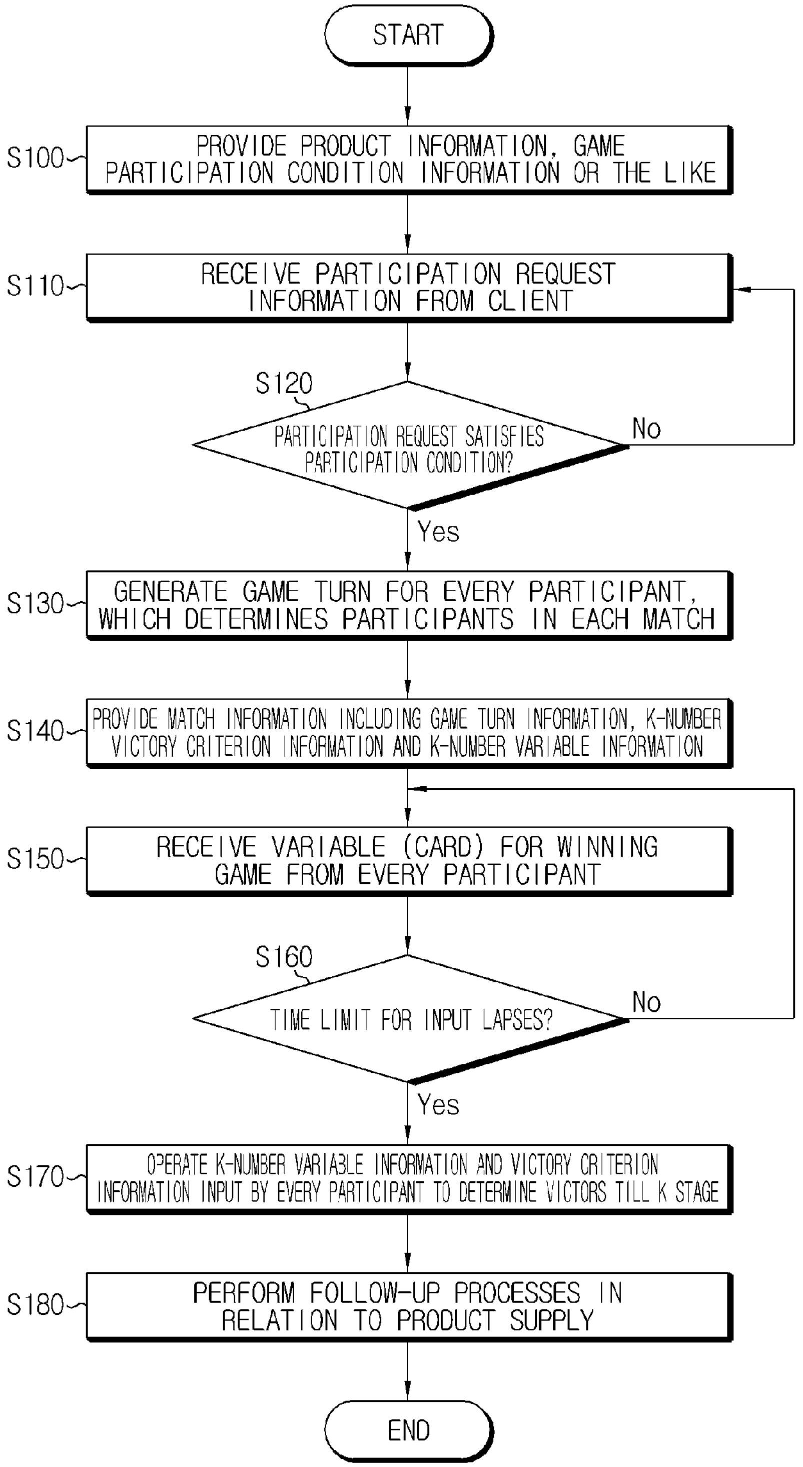
FIG. 3 is a flowchart for illustrating the processes of the method for a tournament-type on-line game or the transaction method using the game according to an embodiment of the present disclosure.

First, the service server 100 implementing the tournament-type on-line transaction method according to the present disclosure may include an interface unit 110, an information providing unit 120, a participation request unit 130, an game turn generating unit 140, a match information processing unit 150, a variable input unit 160, and a victory/defeat calculating unit 170, as shown in FIG. 2.

As the detailed configuration for implementing the present disclosure, first, the interface unit 110 takes charge of exchanging data with the user client 200. Here, the information providing unit 120 of the service server 100 of the present disclosures provides information about the overall description of the game, the contents of game procedures, the products selected as a prize for a game winner, or the like through the interface unit 110, and provides participating condition information about the number of participants or the period of a tournament-type one-on-one game (S100).

The method of the present disclosure proceeds in a tournament manner, and each match in the tournament-type game is preferably selected as a game in which a winner and a loser are determined instantly without a draw, for example coin tossing or an odd and even game, rather than a game allowing a draw, for the purpose of performing the game rapidly and dynamically.

In addition, a time limit may be set in relation to applications for participation, or the number of participants may be limited in the time order, for example by the order of arrival, so that the number of participants becomes a square number of 2 ($2^n$). In this case, the participation conditions are preferably set to solve the complexity of the game and further enhance the predictability, fairness and objectivity of the game procedures so that a game is not won by default. In other words, in the case where the number of participants is a number of 2 as mentioned above, the number of cases where a game is won by default may be 0, and so the game may be performed in a fair and objective way only in a tournament manner.

The set number of participants, the number of first-stage matches determined according to the number of participants, and so on is exemplarily shown in Table 1 below.

TABLE 1

| | n | | | | | | | | | |
|---|---|---|---|---|---|---|---|---|---|---|
| | 1 | 2 | 3 | . . . | 10 | . . . | 13 | 14 | 15 | . . . |
| Power | $2^1$ | $2^2$ | $2^3$ | . . . | $2^{10}$ | . . . | $2^{13}$ | $2^{14}$ | $2^{15}$ | . . . |
| Number of participants | 2 | 4 | 8 | . . . | 1,024 | . . . | 8,192 | 16,384 | 32,768 | . . . |
| Number of first-stage matches | 1 | 2 | 4 | . . . | 512 | . . . | 4,096 | 8,192 | 16,384 | . . . |
| Number of total stages | 1 | 2 | 3 | . . . | 10 | | 13 | 14 | 15 | |

Generally, a tournament-type game proceeds from matches in the first stage to the last and final stage match. In the case where the stages are classified into a first stage, a second stage, . . . , and a final stage, the number of stages performed until the final stage match may be determined according to the number of participants as shown in Table 1.

In other words, in the case where the number of participants is 8,192, each two participants make a group and hold a first-stage match, and so the total number of first-stage matches becomes 4,096. In the case where a final winner must be determined, 13 stages are required until the final-stage match. In addition, the number of matches required for determining the final winner is calculated to be 8,191 by using a mathematical function.

If the description and the participant conditions of the game according to the present disclosure are provided as described above, the participation request unit 130 of the present disclosure receives participation request information from wired/wireless on-line users who intend to participate in the game according to the present disclosure based on the provided information, and stores the information in a database (S110).

The participation request information is preferably obtained through a logging-on process to the service server of the present disclosure so that a product determination process, a delivery process, and processes related to an entry fee or cost may be more effectively performed later.

After that, the game turn generating unit 140 of the present disclosure determines whether the participation request coincides with the participation conditions described above (S120). If the number of participants or the time limit for participation coincides with the predetermined participation condition to finish the receipt of applications for participation, independent game turns are generated to every participant (S130). The game turns may be generated randomly in consideration of the number of the entire participants, or by the order of arrival.

The game turn may represent a turn in first-stage matches, or may include game turns from the first-stage matches to predetermined stage K matches or entire game turns until the final stage match which determines a final single winner.

As a specific example, since the tournament-type game according to the present disclosure proceeds while two participants make a single group, in the first-stage matches, a participant with a game turn #1 has a match with a participant with a game turn #2, a participant with a game turn #5 makes a match with a participant with a game turn #6, and a participant with a game turn #101 make a match with a participant with a game turn #102. In this way, every participant makes a match with an opponent determined according to the game turn.

In the case of second-stage matches, the participants are determined by being given a game turn number dependent on the winner of the first stage match. For example, the winner of the match between #1 and #2 is given game turn #1, and the winner of the match between #3 and #4 is given game turn #2. In addition, the participant with the game turn #1 in the second stage makes a second-stage match with the participant with the game turn #2 in the second stage.

Figure 4:
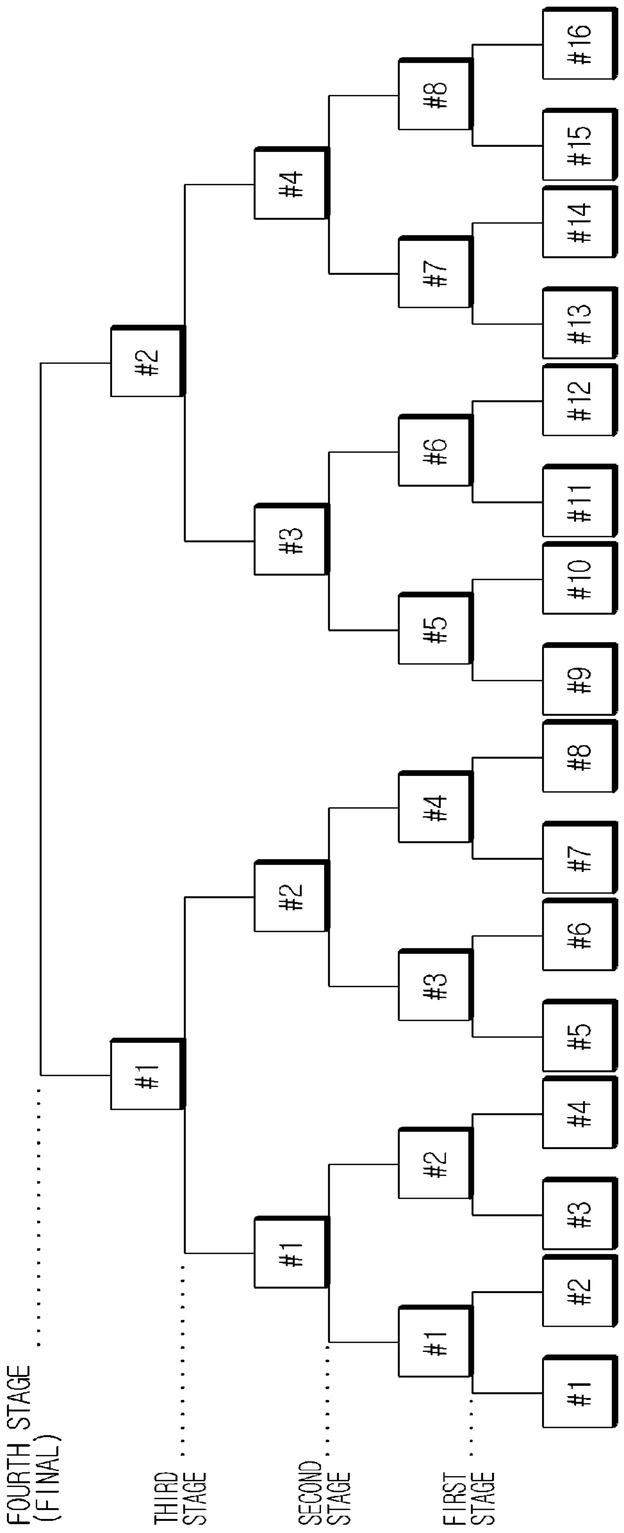
FIG. 4 is a schematic diagram exemplarily showing each stage of the tournament-type game according to an embodiment of the present disclosure.

In a game where the number of participants is 16, which are 2 to the fourth power, participants with game turns #1 to #16 make matches in a tournament manner as shown in FIG. 4, and game turns may be generated as shown in FIG. 5 for every participant.

In this way, a participant participating in a first-stage match may be given a game turn until stage K on the assumption that the participant will win until stage K.

If game turns are generated for every participant, the match information processing unit 150 according to the present disclosure provides match information, which includes game turn information given to the participant, victory criterion information (a kind of winning card) determined in association with the game turn information and allowing the participant to win in each game, and an input circumstance for the input of variable information (a kind of card) for winning each game to every participant (S140). Here, k is a natural number not less than 1.

The functions of the match information processing unit 150 will be described in detail with reference to the accompanying drawings.

First, the game performed in each match of the present disclosure is selected as a game which never ties and determines victory or defeat by obtaining an operation result of variables of both participants and checking whether the operation result corresponds to the victory criterion. For efficient explanation, hereinafter, a game method using an odd and even game will be exemplarily described. Various modifications using games similar or identical to the following game are also apparent to those having ordinary skill in the art.

For both participants making a match, the victory criterion information (a winning card) which becomes a criterion for winning the game is determined in advance according to their game turns. The victory criterion information of a participant having an odd game turn is determined as an odd number, and the victory criterion information of a participant having an even game turn is determined as an even number. The setting for odd and even numbers in the victory criterion information may also be determined in a reverse manner.

After all criterions for winning the game are set, the participants of the game propose variables which may distinguish an odd number and an even number. “1 and 2”, “3 and 4”, “□ and □”, “○ and X”, or other various modifications may be used as the variables, if they may logically distinguish or represent an odd number and an even number. In the following description, the variables "1 and 2" will be used as an example.

Both participants of the game propose 1 or 2, and the operation result, namely the sum of proposed numbers or the difference of proposed numbers (obtained by subtracting a smaller number from a greater number), becomes an odd or even number. If the operation result is an odd number, the participant having an odd game turn, namely the participant having odd number victory criterion information wins the game. If the operation result is an even number, the participant having an even game turn, namely the participant having even number victory criterion information wins the game.

In the above method, a participant of the game maps out strategies such as a psychological warfare in order to deduct a desired operation result corresponding to the victory criterion information of the participant. Therefore, even though the game is simple, the game may be greatly interesting and attractive to participants.

Since the victory criterion information of a participant is generated according to the game turn of the participant, the game turns may be determined up until stage K in advance as described above, and so the victory criterion information may also be determined until stage K in advance.

The victory criterion information arranged based on the same example as in FIG. 5 is shown in FIG. 6.

Since the victory criterion information of a participant is determined according to the game turn of the participant, the match information processing unit 150 according to the present disclosure provides each participant with the match information as shown in FIG. 7, which includes a variable input interface by which the participant inputs variables for the game together with the above contents.

As an example similar to FIG. 7, in a game where the number of participants is 8,192 which is 2 to the $13^{th}$ power, for a participant with a game turn #5001, game turns and victory criterion information (a winning card) are set as in Table 2 below.

the present disclosure receives variable information for determining victory or defeat through the input circumstance of the provided match information from every participant until the time limit (S150).

FIG. 8 shows an example of data about a variable (a card) of each participant for winning a game, performed in the step S150.

If variables (cards) for winning the game are input by participants as shown in FIG. 8, the victory/defeat calculating unit 170 according to the present disclosure operates all variables input by participants in each stage of the tournament-type game by batch processing to determine winners until stage K.

For example, in FIG. 8, it could be understood that a participant with an initial game turn #1 inputs 1 as a card in the first stage, and a participant with an initial game turn #2 who makes a match with the #1 inputs 1 as a card in the first stage. Since two input variables are 1 and 1, if a sum or difference between those variables is calculated by using them as independent variables, the result value becomes 2 or 0, which corresponds to an even number. Therefore, in the match of the first stage between #1 and #2, the winner is #2.

In this way, victory/defeat results of tournament matches for all participants in each stage are operated by batch processing to determine a winner (e.g., a final winner) until a specific stage. In addition, since the operating process is performed by using low-capactiy data input by every participant as variables, even though numerous users play the game simultanesouly, all operations may be performed within a short time to such an extent that the users do not feel bored until the game results is notified.

In addition, in an embodiment, if a participant does not input variable information within the time limit for the input of variables described above, an opponent of the participant not inputting a variable is determined as a winner so that the operation for determining a winner and overall game procedures may be efficiently performed.

TABLE 2

| Participant with initial game turn 5001 (#5001) | | | | | | | | | | | | | |
|---|---|---|---|---|---|---|---|---|---|---|---|---|---|
| | Stage | | | | | | | | | | | | |
| | 1 | 2 | 3 | 4 | 5 | 6 | 7 | 8 | 9 | 10 | 11 | 12 | 13 |
| Game turn | 5001 | 2501 | 1251 | 626 | 313 | 157 | 79 | 40 | 20 | 10 | 5 | 3 | 2 |
| Victory criterion information (winning card) | odd | odd | odd | even | odd | odd | odd | even | even | even | odd | odd | even |

Even though FIG. 7 and Table 2 are exemplarily depicted in a data sheet form using a predetermined look-up table for the convenient understanding of the present disclosure, the match information may be provided together with various game-related guides, descriptions or the like. In addition, the interface window may also be provided in various ways together with various visual effects to be in accordance with the GUI (Graphic User Interface).

If the match information as shown in FIG. 7 is provided to every participant of the game, each participant inputs a variable for winning the game, namely a card. In this case, it is more desirable to set a predetermined time limit for the input so that the game proceeds rapidly.

It is determined whether the time limit for the input lapses (S160). In addition, the variable input unit 160 according to Additionally, in the case where a plurality of participants does not input variables or where both participants in a match do not input variables, virtual variables may be input. In this case, the participant not inputting a variable and receiving a virtual variable may not be selected as a winner in the final stage match, and instead the runner-up, namely the winner of the second prize or the winner of the semifinal stage match, may be determined as the final winner. In this way, the game may be configured to be performed according to predetermined policies.

If a winner is determined until a predetermined stage such as a final stage, follow-up processes such as the notification of the winner and the provision of a product to the winner are performed according to a previously notified or predetermined policy (S190).

In the game procedure by the above-mentioned method, victory or defeat of matches in all stages until the final stage match may be determined by batch processing as described above. In addition, the batch processing may be applied until matches of a specific stage to determine winners of matches until the specific stage, and then victory or defeat of matches after the specific stage, for example from the quarterfinal stage matches to the final stage match, may be determined in real time.

In the case where victory or defeat is determined in real time from a specific stage, a chatting window may be activated so that participants may engage in a psychological warfare for a predetermined period. In addition, users who do not participate in a match may bet money or the like to the corresponding match to attract the interest on the real-time game procedure.

In this case, it is preferred to expose a specific advertisement to users so as to make a profit by the advertisement based on the exposure time, the number of users to which the advertisement is exposed, or the like, and the sponsors may provide premiums or free gifts to users who have placed a bet to the match.

Hereinafter, a tournament-type on-line transaction method according to another embodiment of the present disclosure will be described with reference to FIGS. 9 and 10. In the following disclosure, the contents identical to those of the former embodiment will be not described in detail, and the following description will focus on distinctive features of this embodiment, different from the former embodiment.

Figure 9:
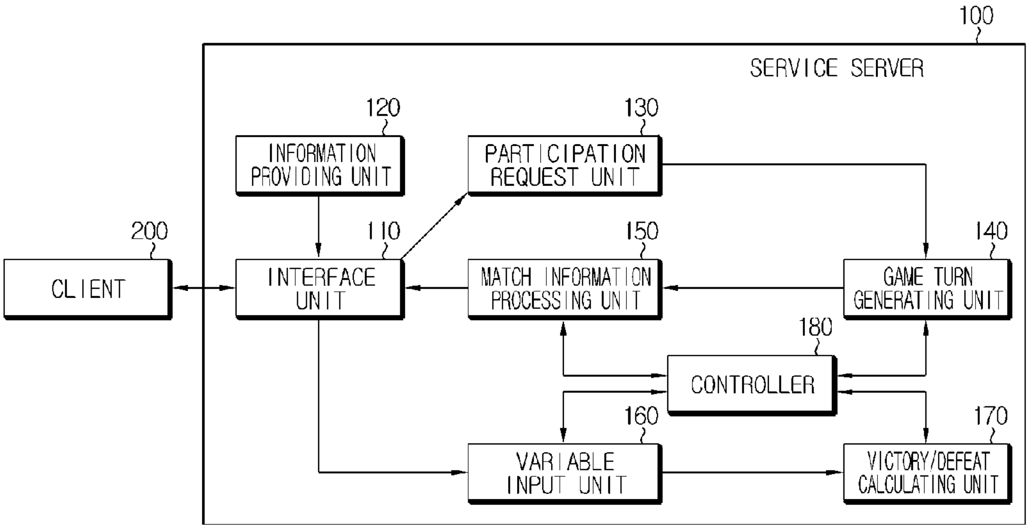
FIG. 9 is a block diagram showing detailed configuration of a service server used in a method for a tournament-type on-line game or a transaction method using the game according to another embodiment of the present disclosure.
Figure 10:
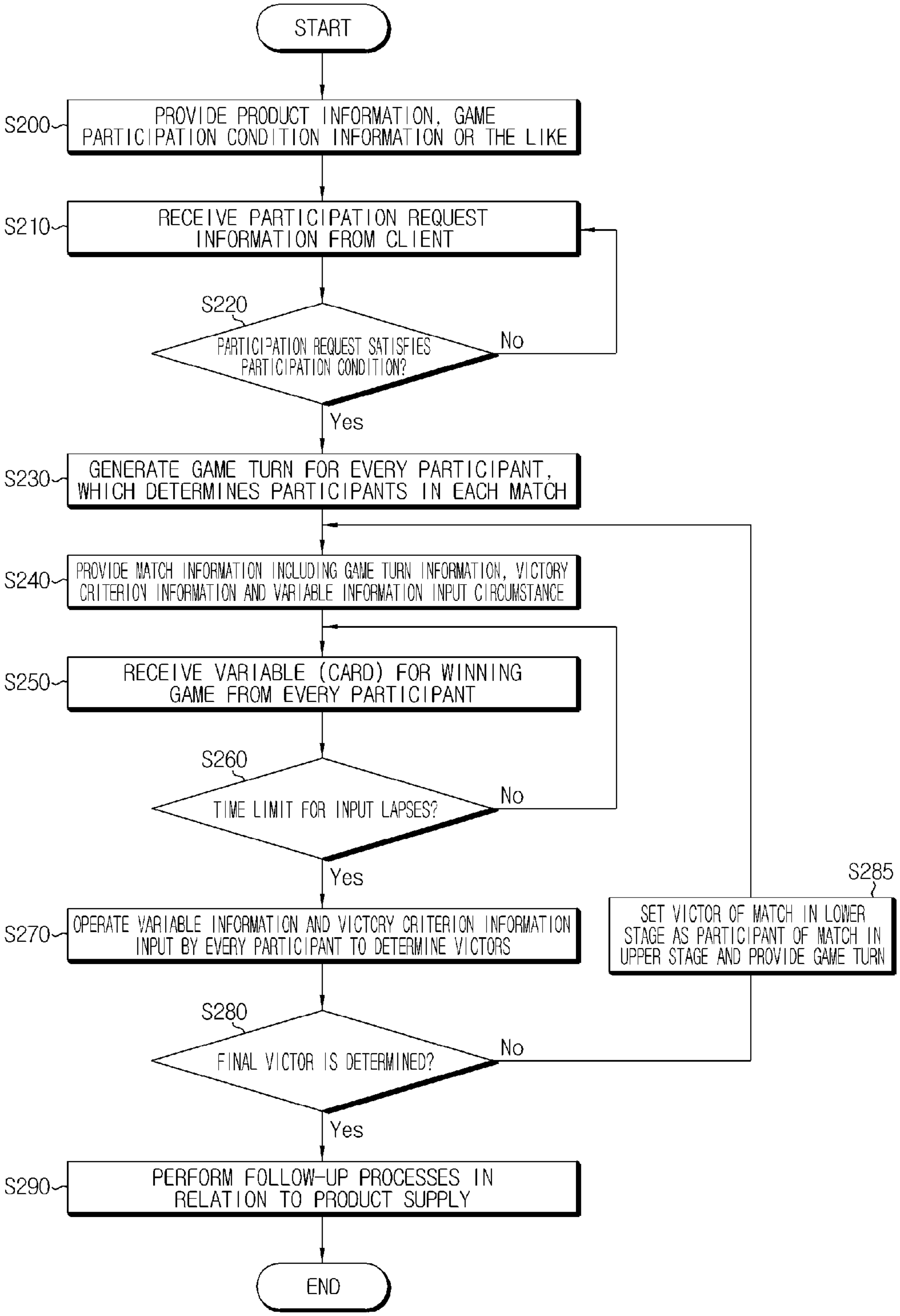
FIG. 10 is a flowchart for illustrating the processes of the method for a tournament-type on-line game or the transaction method using the game according to another embodiment of the present disclosure.

Even though tournament matches are performed by batch processing in the former embodiment, in this embodiment as shown in FIGS. 9 and 10, each match in the tournament-type game is performed in real time, and matches in each stage proceed based on game turns, which are basic operation factors for determining victory or defeat of the matches, and victory criterion information associated with the game turns.

As shown in FIG. 9, the service server 100 of this embodiment includes an interface unit 110, an information providing unit 120, a participation request unit 130, a game turn generating unit 140, a match information processing unit 150, a variable input unit 160, and a victory/defeat calculating unit 170. In addition, the service server 100 of this embodiment is configured to additionally include a controller 180.

Configuration and function of each component of this embodiment and the processes of steps S200 to S230 shown in FIG. 10 are corresponding to the configuration and function of each corresponding component of the former embodiment, and so they are not described in detail here.

In the embodiment for performing matches in each stage as shown in FIGS. 9 and 10, the match information processing unit 150 provides match information, which includes game turn information given to the participant, victory criterion information determined in association with the game turn information and allowing the participant to win in each game, and an input circumstance for the input of variable information for winning each game to every participant (S240). In other words, in this embodiment, game turns, victory criterion information or the like of all matches are not provided, but instead only the match information of where the corresponding participant is participating in is provided.

If the match information of the current status is provided to the corresponding participant, the corresponding participant inputs a variable (a card) for winning the game to the match of the corresponding stage as described above (S250). Then, if the variable (card) of the match of the corresponding stage is input to the variable input unit 160 of the present disclosure within a predetermined time (S260), the victory/defeat calculating unit 170 determines victory or defeat of the match of the corresponding stage by the operation using the input variable (card) and the victory criterion information (S270).

If a winner of the match of the corresponding stage is determined as described above, the controller 180 of this embodiment determines whether a preset final winner is determined (S280). If a final winner is determined, corresponding follow-up processes are performed as in the former embodiment (S290). If a final winner is not determined, in order to perform a match of an upper stage, the controller 180 controls the game turn generating unit 140, the match information processing unit 150, the variable input unit 160, and the victory/defeat calculating unit 170 so that the game turn generating process, the match information providing process, and the victory/defeat calculating process are performed repeatedly by regarding winners of the current stage as participants of an upper stage, until a final winner is determined.

In the present disclosure, each component of the service server 100 should be understood as a logical element rather than a physical element.

In other words, since each component corresponds to a logical component for realizing the technical spirit of the present disclosure, even though components are integrated or separated, they should be interpreted as being within the scope of the present disclosure if the function performed by the logical configuration of the present disclosure may be realized. In addition, a component performing identical or similar functions should also be interpreted as being within the scope of the present disclosure.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A system for a tournament-type on-line game by batch processing, comprising:

at least one client and a server communicating using a wired or wireless network, the server comprising:

an information providing unit configured to transmit participation condition information of the number of participants or the participation period of the game in a one-on-one tournament-type game to a client;

a participation request unit configured to receive participation request information of the game from the client;

a game turn generating unit configured to generate independent game turn information, which determines both participants in each match of the game, to every participant whose participation request is received, after all instances of multiple participation requests from all of the current participants request are received;

a match information processing unit configured to provide match information, which includes the game turn information given to the participant, victory criterion information determined in association with the game turn information and allowing the participant to win in each match without a draw until stage K of the tournament-type game, wherein K is a natural number greater than or equal to 1, and a user interface for the input of variable information for winning each match, to a client of the participant;

a variable input unit configured to receive variable information for every match in all stages of the tournament-type game from the client of the participant through the user interface of the provided match information during the participation period of the game; and a victory/defeat calculating unit configured to operate the received variable information of all matches by one time batch processing to determine winners of all stages including a final winner after the participation period of the game, wherein it is determined whether an operation result of the variable information received from both clients of each match is identical to the victory criterion information so that the participant having the game turn information associated with the victory criterion information identical to the operation result is determined as a winner of each match.

2. The system for a tournament-type on-line game by batch processing according to claim 1, wherein the participation condition information is set so that the number of participants in the tournament-type game corresponds to $2^n$, wherein n is a natural number greater than or equal to 1.

3. The system for a tournament-type on-line game by batch processing according to claim 1, wherein the victory criterion information is an odd number given to one of both participants in the match and an even number given to the other participant in the match, and wherein the variable information is an odd number or an even number, and the victory/defeat calculating unit is configured to operate to obtain a sum or difference of the variable information input by both participants.

4. The system for a tournament-type on-line game by batch processing according to claim 1, wherein the variable input unit is configured to set a time limit for receiving variables so that the participants input variable information within the time limit, and wherein, in the case where a participant does not input variable information within the time limit, the victory/defeat calculating unit is configured to determine an opponent of the participant not inputting variable information as a winner.

* * * * *